Feb. 7, 1950

L. D. JAMES 2,496,944

TAIL GATE FASTENING MEANS

Filed Oct. 30, 1947

Inventor

Lorenzo D. James

By *Clarence A. O'Brien and Harvey B. Jackson*
Attorneys

Feb. 7, 1950     L. D. JAMES     2,496,944
TAIL GATE FASTENING MEANS
Filed Oct. 30, 1947     2 Sheets-Sheet 2
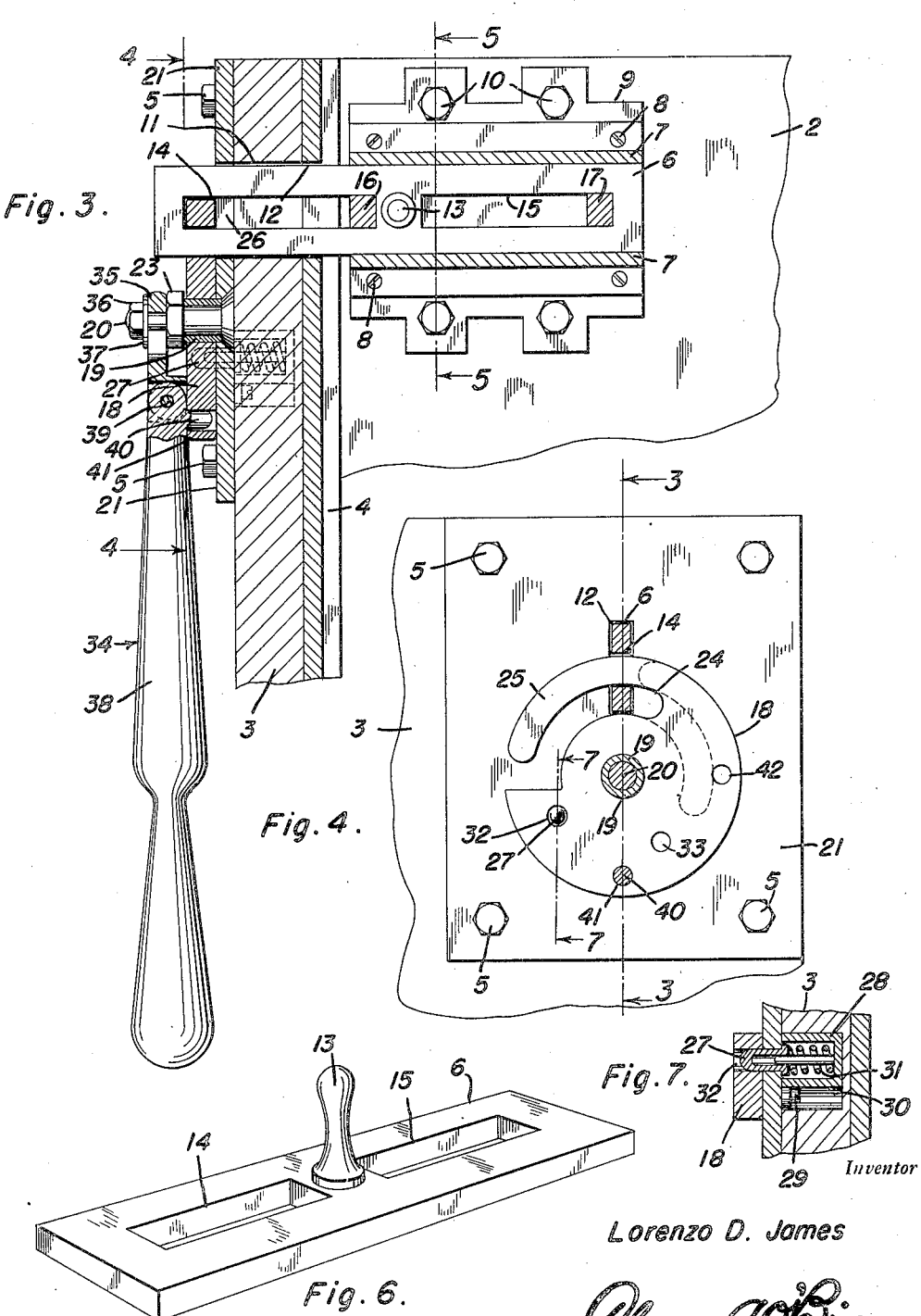
Inventor
Lorenzo D. James Patented Feb. 7, 1950

2,496,944

UNITED STATES PATENT OFFICE 2,496,944

TAIL GATE FASTENING MEANS

Lorenzo D. James, Long Beach, Calif., assignor of one-half to Flora L. Taulman, Long Beach, Calif.

Application October 30, 1947, Serial No. 783,012

3 Claims. (Cl. 292—200)

My invention relates to improvements in tail gate fastening means for wagons, or truck bodies, and the like, the primary object in view to provide a simple form of fastening means for securely holding the vertically slidable tail gate of a wagon, or truck, body down and closed and fastened to the sides of the body so as to obviate spreading of said sides, under the weight of a load in the body, and prevent vibration and chattering of said sides and the tail gate.

Another object is to provide means of the character and for the purpose above set forth which is self locking, easy to unlock, will not quickly get out of order through wear, and is comparatively inexpensive to manufacture and install.

Other and subordinate objects, within the purview of my invention, together with the precise nature of my improvements will be readily understood when the succeeding description and claims are read with reference to the drawings accompanying and forming part of this specification.

In said drawings:

Figure 3 is a view in vertical section taken on the line 3—3 of Figure 2 and drawn to a larger scale;

Figure 4 is a view in vertical section taken on the line 4—4 of Figure 3;

Figure 6 is a view in perspective of one of the latch bolts;

Figure 7 is a view in vertical section taken on the line 7—7 of Figure 4 and drawn to a larger scale;

Figure 1:
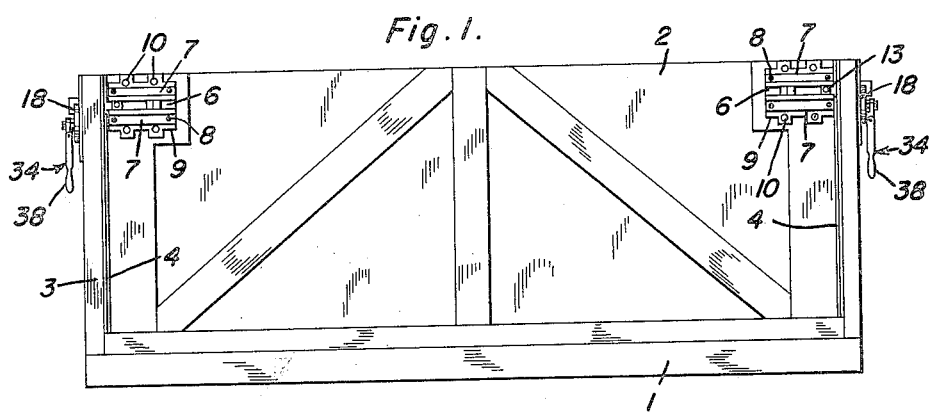
Figure 1 is a view in rear elevation illustrating my improved tail gate fastening means, in a preferred embodiment thereof, applied to the tail gate and body of a wagon or truck.
Figure 2:
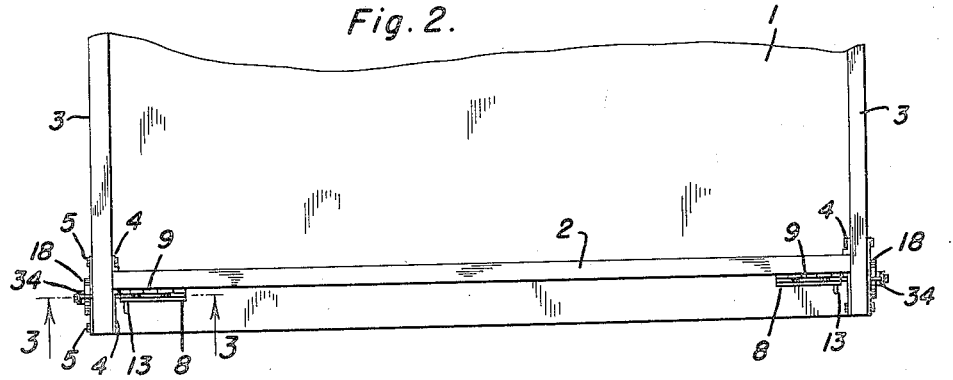
Figure 2 is a fragmentary view in plan.
Figure 5:
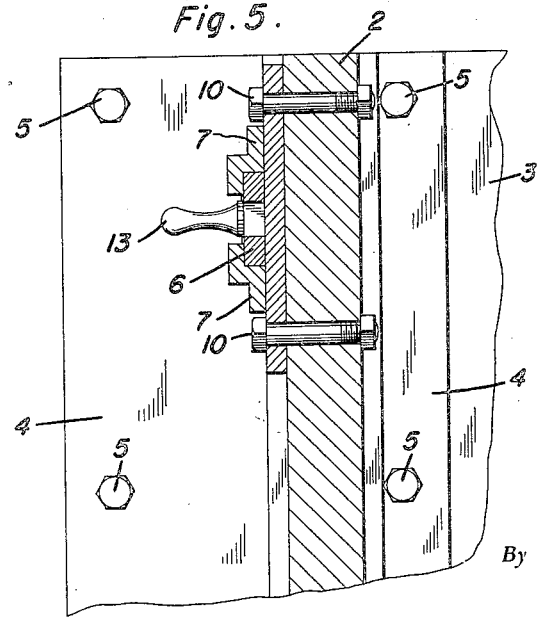
Figure 5 is a view in vertical section taken on the line 5—5 of Figure 3.
Figure 8:
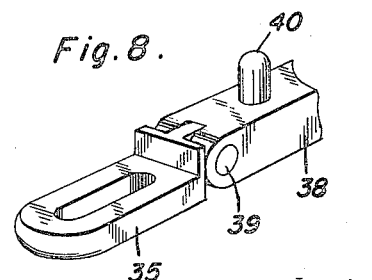
Figure 8 is a fragmentary view in perspective of the hand lever.

Referring to the drawings by numerals, my improved tail gate fastening means has been shown therein, for the purpose of illustration, as applied to the usual open type wagon, or truck, body 1 in which the tail gate 2 is interposed endwise between the sides 3 of said body for vertical sliding movement to close down or be lifted up for opening or removing the same.

According to my invention, a pair of vertical front and rear, angle bar guides 4 are provided on the inner faces of each side 3 of said body 1 for each end of the tail gate 2 and which are bolted in place as at 5, and duplicate tail gate fastening means are provided at each end of the tail gate 2 and now to be described.

The fastening means in each instance comprises a flat latch bolt 6 at one upper corner of the tail gate 2 slidably mounted between horizontal guides 7 of right angled cross section secured by screws 8 to a mounting plate 9 bolted, as at 10, to the rear side of the tail gate 2, the latch bolt 6 being projectable outwardly through the adjacent side 3 of the body 1 by way of a horizontal slot 11 in said side and a similar slot 12 in the rear guide 4 on said side. A rearwardly projecting stud 13 on the latch bolt 6, in the center thereof, provides a hand grip thereon for use in projecting and retracting said bolt. A pair of front and rear longitudinal slots 14, 15 are provided in the latch bolt 6 upon opposite sides of the transverse center thereof, and a pair of rearwardly extending, square stop studs 16, 17 on the mounting plate 9 which are adapted to engage the rear ends of said slots 14, 15, respectively, to establish the fully projected position of the latch bolt 6, and to engage the front ends of said slots 14, 15, respectively, to establish the fully retracted position of said bolt 6. When fully retracted, the latch bolt 6 clears the side 3 to free the tail gate 2 for vertical sliding, as will be clear.

At the upper corner of the side 3, adjacent the latch bolt 6, a bolt locking disk 18 with an axial bushing 19 therein is mounted on a horizontal stud 20 extending from a mounting plate 21 bolted to the outer face of the side 3 by some of the bolts 5, said disk 18 being rotatable in a plane transverse to the plane of the latch bolt 6. A lock nut 23 retains the bolt locking disk 18 and bushing 19 on said stud 20. The bolt locking disk 18 is slotted, as at 24, to form on said disk a circumferential, arcuate, concentric hook 25 adapted to be revolved into the outer end of the front slot 14 of the latch bolt 6 to lock said bolt against retraction. A slot 26 in the mounting plate 21 provides for projection of the latch bolt 6 through said plate to interpose the front end of the front slot 14 in the path of revolution of said hook 25 and just sufficiently for said hook to enter said slot.

A spring biased, hollow, detent plunger 27 is slidably mounted in a barrel 28 bolted, as at 29, in a recess 30 in the side 3 and is adapted to be projected by its spring 31 to enter, with a snap action, into one or the other of a pair of circumferentially spaced apertures 32, 33 in said locking disk 18, to thereby hold said locking disk against rotation in the locking and unlocking positions of said disk respectively. The detent plunger 27 is adapted to be pushed in opposition to the spring 32 out of said apertures 32, 33 to free said locking disk 18.

An articulated hand lever 34 is provided for pushing said plunger out of the apertures 32, 33 and rotating said locking disk 18 and which comprises a slotted head 35 slidable and rotatable on the stud 20 and loosely retained thereon by a nut 36 and washer 37, and a handle 38 pivoted on said head, as at 39, for swinging thereon toward and from said locking disk 18 respectively.

The hand lever 34 is designed to hang pendant from the stud 20, normally, and is provided with a lateral pin 40 adapted to be inserted, by swinging of said handle toward said locking disk 18 into either of a pair of circumferentially spaced apertures 41, 42 in said locking disk, said pin being insertable in said apertures 41, 42 in the locking and unlocking positions of said locking disk 18 to keep said lever from swinging on said stud 20. The pin 40 is so arranged on the handle 38 that by swinging the handle 38 away from said locking disk 18 to withdraw the pin out of either aperture 41, 42, said head 35 may be slid on the stud 20, and handle 38 then swung toward said locking disk 18 to enter said pin 40 in either aperture 32, 33 to push the plunger 27 out of said apertures 32, 33 and couple said lever to said locking disk 18 for rotation of said locking disk in opposite directions by said lever into locking and unlocking positions respectively.

The manner in which the described fastening means are operated to fasten the tail gate 2 will be readily understood. With the bolt locking disk 18 rotated into unlocking position, shown by dotted lines in Figure 4, said disk is held in such position by the plunger 27 being projected into the aperture 33. The hand lever 34, in this position of the bolt locking disk 18 is designed to hang pendant with the pin 40 inserted in aperture 42. The latch bolt 6 is now slid from fully retracted position into fully projected position, in the manner already described, whereby its front end is projected in the slot 24 with the front end of its front slot 14 interposed in the path of revolution of the hook 25. With the latch bolt 6 thus projected, the hand lever 34 may be manipulated in the manner already described to withdraw the pin 40 from the aperture 42, insert the same in the aperture 33, push the plunger 27 out of said aperture 33 and couple said lever to said locking disk 18 for swinging around the stud 20 to rotate said locking disk 18, counterclockwise as viewed in Figure 4 into bolt locking position in which the hook 25 enters the front end of the front slot 14, shown in full lines in Figure 4, and locks said latch bolt 6 against retraction. In this locking position of said locking disk 18, the plunger 27 snaps into the aperture 32 and holds said locking disk 18 against rotation as shown in Figure 4. Thus the latch bolt 6 is locked, which is to say the fastener means, and the tail gate 2 is locked down and closed. Also, in this position of the locking disk 18, the pin 40 may be inserted in the aperture 41, as shown in Figure 4. With both tail gate fastening means operated in the manner described, the tail gate 2 is locked down at each end thereof and the sides 3 of the body 1 tied together against spreading, and, together with the tail gate 2 against vibrating and chattering. The manner in which the tail gate fastening means are operated to unfasten the tail gate 2 will, it is believed, be clear from the description of the manner in which the same are operated to fasten said tail gate down.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Tail gate fastening means for securing a tail gate to one side of a wagon body comprising a latch bolt slidable on said tail gate to project the same through said side into latching position and having a slot therein, means on said side rotatable into a bolt locking position and entering said slot in said position thereof, means for holding said rotatable means against rotation in the locking position thereof operative to ineffective position, and an articulated hand lever swingable as a unit in one direction about one axis to rotate said rotatable means and including a handle swingable in another direction about another axis to operate said holding means to ineffective position and simultaneously couple said lever to said rotatable means.

2. Tail gate fastening means for securing a tail gate to one side of a wagon body comprising a latch bolt slidable on said tail gate to project the same through said side into latching position and having a slot therein, means on said side rotatable into a bolt locking position and entering said slot in said position thereof, means for holding said rotatable means against rotation in the locking position thereof operative to ineffective position, and an articulated hand lever swingable as a unit in one direction about one axis to rotate said rotatable means and including a handle swingable in another direction about another axis to operate said holding means to ineffective position and simultaneously couple said lever to said rotatable means, said rotatable means comprising a member forming a hook adapted to fit in said slot, said holding means comprising a spring biased stud, and said member having an aperture therein in which said stud is projected by its spring with a snap action.

3. Tail gate fastening means for securing one end of a tail gate to one side of a wagon body comprising a latch bolt slidable on said tail gate to project the same through said side into latching position, a bolt locking disk having a circumferential arcuate hook thereon and rotatable on said side into a locking position to revolve said hook into said slot and thereby lock said latch bolt projected, detent means interlocking with said disk with a snap action to prevent the same from being rotated out of locking position, said means being operative to free said disk, and an articulated hand lever swingable about the axis of said disk to rotate the same and including a handle swingable about another axis laterally of said disk to operate said means into disk freeing position and simultaneously couple said handle to said disk.

LORENZO D. JAMES.

REFERENCES CITED

The following references are of record in the file of this patent:

UNITED STATES PATENTS

| Number | Name | Date |
| --- | --- | --- |
| 489,386 | Morris | Jan. 3, 1893 |
| 1,768,659 | Bisek | July 1, 1930 |